United States Patent
Cojocaru et al.

(10) Patent No.: US 10,000,272 B2
(45) Date of Patent: Jun. 19, 2018

(54) THERMAL ACOUSTIC INSULATION BLANKETS

(71) Applicant: SOLVAY SPECIALITY POLYMERS ITALY S.P.A., Bollate, MI (US)

(72) Inventors: Paula Cojocaru, Legnano (IT); Stefano Mortara, Arconate (IT); Francesco Maria Triulzi, Garbagnate Milanese (IT); Marco Apostolo, Senago (IT)

(73) Assignee: SOLVAY SPECIALTY POLYMERS ITALY S.P.A., Bollate (Milan) (IT)

( * ) Notice: Subject to any disclaimer, the term of this patent is extended or adjusted under 35 U.S.C. 154(b) by 0 days. days.

(21) Appl. No.: 15/106,904

(22) PCT Filed: Dec. 23, 2014

(86) PCT No.: PCT/EP2014/079122
§ 371 (c)(1),
(2) Date: Jun. 21, 2016

(87) PCT Pub. No.: WO2015/097206
PCT Pub. Date: Jul. 2, 2015

(65) Prior Publication Data
US 2017/0001709 A1 Jan. 5, 2017

(30) Foreign Application Priority Data
Dec. 23, 2013 (EP) .................... 13199363

(51) Int. Cl.
| B64C 1/40 | (2006.01) |
| B32B 5/02 | (2006.01) |
| B32B 5/18 | (2006.01) |
| B32B 27/06 | (2006.01) |
| B32B 27/12 | (2006.01) |
| B32B 27/16 | (2006.01) |
| B32B 27/28 | (2006.01) |
| B32B 27/30 | (2006.01) |
| C08J 5/18 | (2006.01) |
| C23C 18/18 | (2006.01) |
| C23C 18/42 | (2006.01) |

(52) U.S. Cl.
CPC ............ *B64C 1/40* (2013.01); *B32B 5/02* (2013.01); *B32B 5/024* (2013.01); *B32B 5/18* (2013.01); *B32B 27/065* (2013.01); *B32B 27/12* (2013.01); *B32B 27/16* (2013.01); *B32B 27/288* (2013.01); *B32B 27/304* (2013.01); *C08J 5/18* (2013.01); *C23C 18/1875* (2013.01); *C23C 18/42* (2013.01); *B32B 2255/10* (2013.01); *B32B 2255/205* (2013.01); *B32B 2262/02* (2013.01); *B32B 2262/10* (2013.01); *B32B 2307/10* (2013.01); *B32B 2307/102* (2013.01); *B32B 2307/304* (2013.01); *B32B 2307/306* (2013.01); *B32B 2307/3065* (2013.01); *B32B 2371/00* (2013.01); *B32B 2375/00* (2013.01); *B32B 2605/18* (2013.01); *C08J 2371/10* (2013.01)

(58) Field of Classification Search
CPC .................................................... C09D 5/4457
USPC ........................................................ 428/457
See application file for complete search history.

(56) References Cited

U.S. PATENT DOCUMENTS

| 4,990,363 A | 2/1991 | Suhr et al. |
| 2005/0282969 A1 | 12/2005 | Comino et al. |
| 2013/0092321 A1 | 4/2013 | Fernando et al. |

FOREIGN PATENT DOCUMENTS

| CN | 1668777 A | 9/2005 |
| CN | 1712447 A | 12/2005 |
| EP | 526363 A2 | 2/1993 |
| WO | 200232663 A1 | 4/2002 |
| WO | 03/104526 A1 | 12/2003 |
| WO | 2010/123771 A1 | 10/2010 |
| WO | 102405172 A | 4/2012 |

OTHER PUBLICATIONS

Alger Mark S.M., "Polymer Science Dictionary", 1989, London School of Polymer Technology, Polytechnic of North London, UK published by Elsevier Applied Science, p. 476.
Wang, Wenchang et al., "Practical Techniques of Modification for Plastics", China Light Industry Press, p. 119-121; with English Language Abstract. (No English Language counterpart available).

*Primary Examiner* — Terressa Boykin

(57) ABSTRACT

The present invention pertains to an insulation system comprising one or more insulation blankets, wherein each of said multilayer insulation blankets comprises: —a core consisting of an insulation material [material (I)], and —a shell encapsulating said core, said shell comprising at least one multilayer assembly comprising: (1) an outer layer [layer (L1)] consisting of a composition [composition (C1)] comprising, preferably consisting of, at least one thermoplastic polymer [polymer (1)] having a limiting oxygen index (LOI) of at least 20% by volume, wherein at least one surface, preferably the inner surface, of said layer (L1) comprises one or more grafted functional groups [surface (L1-f)], (2) directly adhered to said at least one surface (L1-f), a layer consisting of at least one metal compound (M1) [layer (L2)], and (3) optionally, directly adhered to the opposite side of the layer (L2), a layer consisting of at least one metal compound (M2) [layer (L3)], said metal compound (M2) being equal to or different from said metal compound (M1). The present invention also pertains to a process for the manufacture of said insulation system and to uses of said insulation system in various applications including aircraft applications.

16 Claims, No Drawings

THERMAL ACOUSTIC INSULATION BLANKETS

This application is a U.S. national stage entry under 35 U.S.C. § 371 of International Application No. PCT/EP2014/079122 filed Dec. 23, 2014, which claims priority to European application No. 13199363.6 filed on Dec. 23, 2013. The entire contents of these applications are explicitly incorporated herein by this reference.

TECHNICAL FIELD

The present invention pertains to an insulation system comprising one or more insulation blankets and to uses thereof in various applications including aircraft applications.

BACKGROUND ART

Thermal acoustic insulation blankets are widely used in various applications including aircraft applications to provide thermal insulation and acoustic damping.

Insulation blankets suitable for use in aircraft insulation systems are typically placed into the cavity between the aircraft fuselage skin panels and the aircraft interior panels. These insulation blankets are typically multilayer assemblies incorporating one or more fire-resistant layers providing a flame spread barrier to the insulation blanket so as to protect passengers of an aircraft in the event of a fire such as a ground fuel fire or a post-crash fire.

The longer it takes for the fire to penetrate the aircraft fuselage, the more time aircraft passengers may have to evacuate the aircraft before being overcome by smoke or heat from the fire.

According to regulations contained in 14 C.F.R. Section, Part 25, 25.856(a), 25.856(b) and part VII of Appendix F, the Federal Aviation Administration (FAA) requires thermal acoustic insulation blankets to provide improved burn-through protection and flame propagation resistance in certain areas of airplanes.

Known thermal acoustic insulation blankets are usually encapsulated within a film covering or bag. FAA burn-through regulations primarily affect the content of the insulation system bags, whereas the FAA flame propagation resistance regulations primarily affect the film coverings to fabricate the bags.

Among drawbacks of the prior art insulation blankets is that, depending on the material of construction, the blankets may contribute to the propagation of fire when exposed to a flame under a radiant heat source.

The film coverings thus typically comprise a barrier outer layer further minimizing moisture uptake and hence weight increase of the insulation blanket due to water entrapment during service.

For instance, US 2013/0092321 (UNIFRAX I LLC; LAMART CORPORATION) 18 Apr. 2013 describes fire barrier laminates wherein the first polymeric flame propagation resistant film may be metallized to minimize moisture absorption, particularly on the outboard side, but optionally also on the inboard side.

There thus remains a need in the art for long lasting, durable thermal and acoustic blankets suitable for use in aircraft fuselage insulation systems providing for a lower permeability to gases and an improved flame spread resistance.

SUMMARY OF INVENTION

It has been now surprisingly found that by the process of the invention, in particular by treatment of a polymer layer by a radio-frequency glow discharge process in the presence of an etching gas followed by deposition thereto of a metal layer, an insulation system is provided having enhanced interlayer adhesion properties and lower permeability to gases such as water vapour, thus advantageously providing for improved corrosion resistance of the aircraft skin as well as improved fuel efficiency and payload capacity of the aircraft.

It has been also found that, by selecting properly the material of the outer polymer layer, the insulation system thereby provided is successfully endowed with outstanding flame spread resistance and good mechanical properties and is advantageously resistant to breakage while maintaining outstanding flexibility properties over the long term.

In a first aspect, the present invention pertains to an insulation system comprising one or more insulation blankets, wherein each of said multilayer insulation blankets comprises:
- a core consisting of an insulation material [material (I)], and
- a shell encapsulating said core, said shell comprising at least one multilayer assembly comprising:
  (1) an outer layer [layer (L1)] consisting of a composition [composition (C1)] comprising, preferably consisting of, at least one thermoplastic polymer [polymer (1)] having a limiting oxygen index (LOI) of at least 20% by volume, wherein at least one surface, preferably the inner surface, of said layer (L1) comprises one or more grafted functional groups [surface (L1-f)],
  (2) directly adhered to said at least one surface (L1-f), a layer consisting of at least one metal compound (M1) [layer (L2)], and
  (3) optionally, directly adhered to the opposite side of the layer (L2), a layer consisting of at least one metal compound (M2) [layer (L3)], said metal compound (M2) being equal to or different from said metal compound (M1).

In a second aspect, the present invention pertains to a process for the manufacture of an insulation system comprising one or more insulation blankets, said process comprising the following steps:
(A) providing a shell comprising a multilayer assembly, said multilayer assembly being obtainable by:
(A-i) providing a layer [layer (L1)] consisting of a composition [composition (C1)] comprising, preferably consisting of, at least one thermoplastic polymer [polymer (1)] having a limiting oxygen index (LOI) of at least 20% by volume,
(A-ii) treating at least one surface, preferably the inner surface, of said layer (L1) by a radio-frequency glow discharge process in the presence of an etching gas medium,
(A-iii) applying by electroless deposition a layer consisting of at least one metal compound (M1) [layer (L2)] onto said at least one treated surface of the layer (L1) as provided in step (A-ii), and
(A-iv) optionally, applying by electro-deposition a layer consisting of at least one metal compound (M2) [layer (L3)], said metal compound (M2) being equal to or different from said metal compound (M1), onto the opposite side of the layer (L2) as provided in step (A-iii);
(B) providing a core consisting of an insulation material [material (I)]; and
(C) encapsulating said core by the shell.

The insulation system of the invention is advantageously obtainable by the process of the invention.

The layer (L1) is advantageously the outer layer of the shell.

In a third aspect, the present invention pertains to use of the insulation system of the invention in various applications. The insulation system of the invention is suitable for use in aircrafts, in transportation vehicles such as race cars, automobiles, trains and buses, in spacecrafts such as space shuttles and rockets, in protective clothing such as firefighters' turnout coats and other gears, in protective garments such as gloves, aprons and gaiters worn in welding applications or in the metal-working industry, in ingot moulds, in survival suits worn by mariners or military rescue personnel, in insulating bedding materials, in sleeping bags, in pipe insulation, in door seals for furnaces, ovens and boilers and in thermal protection of electrical wires or cables.

The insulation system of the invention is particularly suitable for use in aircraft applications.

According to an embodiment of the invention, the insulation system of the invention typically further comprises:
(4) directly adhered to the opposite side of either layer (L2) or layer (L3), if any, a layer [layer (L4)] consisting of an inorganic material [material (IN)],
(5) optionally, directly adhered to the opposite side of layer (L4), an adhesive layer [layer (L5)], and
(6) optionally, directly adhered to the opposite side of layer (L5), a layer [layer (L6)] consisting of one or more fibres consisting of a thermoplastic polymer [polymer (2)], said polymer (2) being equal to or different from said polymer (1).

The insulation system according to this embodiment of the invention is typically obtainable by the process of the invention further comprising the following steps:
(A) providing a shell comprising a multilayer assembly, said multilayer assembly being obtainable by:
(A-v) applying a layer (L4) onto the opposite side of either layer (L2) or layer (L3), if any, of the multilayer assembly provided in step (A-iv),
(A-vi) optionally, applying a layer (L5) onto the opposite side of layer (L4), and
(A-vii) optionally, applying a layer (L6) onto the opposite side of layer (L5);
(B) providing a core consisting of an insulation material [material (I)]; and
(C) encapsulating said core by the shell.

The layer (L1) is advantageously the outer layer of the shell.

For the purpose of the present invention, the term "thermoplastic" is understood to mean a polymer composition existing, at room temperature, below its glass transition temperature, if it is amorphous, or below its melting point if it is semi-crystalline, and which is linear or branched (i.e. not reticulated). This polymer composition has the property of becoming soft when it is heated and of becoming rigid again when it is cooled, without there being an appreciable chemical change. Such a definition may be found, for example, in the encyclopedia called "Polymer Science Dictionary", Mark S. M. Alger, London School of Polymer Technology, Polytechnic of North London, UK, published by Elsevier Applied Science, 1989.

The polymer (1) has advantageously a limiting oxygen index (LOI) of at least 25%, preferably of at least 30% by volume.

For the purpose of the present invention, by "limiting oxygen index LOI" it is intended to denote the minimum concentration of oxygen required in the air mixture to support the downward burning of a vertically placed strip specimen. High oxygen concentration requirement indicate better flame retardancy of the specimen.

The limiting oxygen index (LOI) can be measured according to any suitable techniques.

The limiting oxygen index (LOI) is typically measured according to ASTM D2863 standard procedures.

The thickness of the layer (L1) is not particularly limited; it is nevertheless understood that layer (L1) will have typically a thickness of at least ×3 µm, preferably of at least 5 µm. Layers (L1) having thickness of less than 3 µm, while still suitable for the insulation system of the invention, will not be used when adequate mechanical resistance is required.

As per the upper limit of the thickness of the layer (L1), this is not particularly limited, provided that said layer (L1) still can provide the flexibility required for the particular field of use targeted. The layer (L1) will have typically a thickness of at most 20 µm, preferably of at most 15 µm.

The skilled in the art, depending on the nature of the polymer (1), will select the proper thickness of the layer (L1) so as to provide for the permeability and flexibility properties required.

The polymer (1) is preferably selected from the group consisting of:
  a fluoropolymer [polymer (F)] having a limiting oxygen index (LOI) of at least 30% by volume, and
  a poly(aryl ether ketone) [polymer (PAEK)] having a limiting oxygen index (LOI) of at least 30% by volume.

The term "fluoropolymer [polymer (F)]" is understood to mean a fluoropolymer comprising recurring units derived from at least one fluorinated monomer.

By the term "fluorinated monomer" it is hereby intended to denote an ethylenically unsaturated monomer comprising at least one fluorine atom.

The term "at least one fluorinated monomer" is understood to mean that the polymer (F) may comprise recurring units derived from one or more than one fluorinated monomers. In the rest of the text, the expression "fluorinated monomers" is understood, for the purposes of the present invention, both in the plural and the singular, that is to say that they denote both one or more than one fluorinated monomers as defined above.

Non limitative examples of suitable fluorinated monomers include, notably, the followings:
  $C_3$-$C_8$ perfluoroolefins, such as tetrafluoroethylene (TFE) and hexafluoropropene (HFP);
  $C_2$-$C_8$ hydrogenated fluoroolefins, such as vinylidene fluoride (VDF), vinyl fluoride, 1,2-difluoroethylene and trifluoroethylene (TrFE);
  perfluoroalkylethylenes of formula $CH_2$=CH—$R_{f0}$ wherein $R_{f0}$ is a $C_1$-$C_6$ perfluoroalkyl group;
  chloro- and/or bromo- and/or iodo-$C_2$-$C_6$ fluoroolefins, such as chlorotrifluoroethylene (CTFE);
  (per)fluoroalkylvinylethers of formula $CF_2$=$CFOR_{f1}$ wherein $R_{f1}$ is a $C_1$-$C_6$ fluoro- or perfluoroalkyl group, e.g. $CF_3$, $C_2F_5$, $C_3F_7$;
  $CF_2$=$CFOX_0$ (per)fluoro-oxyalkylvinylethers, wherein $X_0$ is a $C_1$-$C_{12}$ alkyl group, a $C_1$-$C_{12}$ oxyalkyl group or a $C_1$-$C_{12}$ (per)fluorooxyalkyl group comprising one or more ether groups, such as perfluoro-2-propoxy-propyl group;

(per)fluoroalkylvinylethers of formula $CF_2$=$CFOCF_2OR_{f2}$ wherein $R_{f2}$ is a $C_1$-$C_6$ fluoro- or perfluoroalkyl group, e.g. $CF_3$, $C_2F_5$, $C_3F_7$ or a $C_1$-$C_6$ (per)fluorooxyalkyl group comprising one or more ether groups, such as —$C_2F_5$—O—$CF_3$;

functional (per)fluoro-oxyalkylvinylethers of formula $CF_2$=$CFOY_0$, wherein $Y_0$ is a $C_1$-$C_{12}$ alkyl or (per) fluoroalkyl group, a $C_1$-$C_{12}$ oxyalkyl group or a $C_1$-$C_{12}$ (per)fluorooxyalkyl group comprising one or more ether groups and $Y_0$ comprising a carboxylic or sulfonic acid group, in its acid, acid halide or salt form;

fluorodioxoles, preferably perfluorodioxoles; and cyclopolymerizable monomers of formula $CR_7R_8$=$CR_9OCR_{10}R_{11}(CR_{12}R_{13})_a(O)_bCR_{14}$=$CR_{15}R_{16}$, wherein each $R_7$ to $R_{16}$, independently of one another, is selected from —F and a $C_1$-$C_3$ fluoroalkyl group, a is 0 or 1, b is 0 or 1 with the proviso that b is 0 when a is 1.

The polymer (F) may further comprise at least one hydrogenated monomer.

By the term "hydrogenated monomer" it is hereby intended to denote an ethylenically unsaturated monomer comprising at least one hydrogen atom and free from fluorine atoms.

The term "at least one hydrogenated monomer" is understood to mean that the polymer (F) may comprise recurring units derived from one or more than one hydrogenated monomers. In the rest of the text, the expression "hydrogenated monomers" is understood, for the purposes of the present invention, both in the plural and the singular, that is to say that they denote both one or more than one hydrogenated monomers as defined above.

Non limitative examples of suitable hydrogenated monomers include, notably, non-fluorinated monomers such as ethylene, propylene, vinyl monomers such as vinyl acetate, (meth)acrylic monomers and styrene monomers such as styrene and p-methylstyrene.

The polymer (F) may be semi-crystalline or amorphous.

The term "semi-crystalline" is hereby intended to denote a polymer (F) having a heat of fusion of from 10 to 90 J/g, preferably of from 30 to 60 J/g, more preferably of from 35 to 55 J/g, as measured according to ASTM D3418-08.

The term "amorphous" is hereby intended to denote a polymer (F) having a heat of fusion of less than 5 J/g, preferably of less than 3 J/g, more preferably of less than 2 J/g as measured according to ASTM D-3418-08.

The polymer (F) is typically selected from the group consisting of:

polymers (F-1) comprising recurring units derived from at least one fluorinated monomer selected from tetrafluoroethylene (TFE) and chlorotrifluoroethylene (CTFE), and from at least one hydrogenated monomer selected from ethylene, propylene and isobutylene, optionally containing one or more additional comonomers, typically in amounts of from 0.01% to 30% by moles, based on the total amount of TFE and/or CTFE and said hydrogenated monomer(s);

polymers (F-2) comprising recurring units derived from vinylidene fluoride (VDF), and, optionally, from one or more fluorinated monomers different from VDF;

polymers (F-3) comprising recurring units derived from tetrafluoroethylene (TFE) and at least one fluorinated monomer different from TFE selected from the group consisting of:

perfluoroalkylvinylethers of formula $CF_2$=$CFOR_{f1}$, wherein $R_{f1}$ is a $C_1$-$C_6$ perfluoroalkyl group;

perfluoro-oxyalkylvinylethers of formula $CF_2$=$CFOX_0$ wherein $X_0$ is a $C_1$-$C_{12}$ perfluorooxyalkyl group comprising one or more ether groups, such as perfluoro-2-propoxy-propyl group;

$C_3$-$C_8$ perfluorooolefins, such as hexafluoropropene (HFP); and perfluorodioxoles of formula (I):

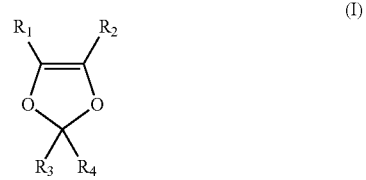

wherein $R_1$, $R_2$, $R_3$ and $R_4$, equal to or different from each other, are independently selected from the group consisting of —F, a $C_1$-$C_6$ fluoroalkyl group, optionally comprising one or more oxygen atoms, and a $C_1$-$C_6$ fluoroalkoxy group, optionally comprising one or more oxygen atoms; and polymers (F-4) comprising recurring units derived from at least one cyclopolymerizable monomer of formula $CR_7R_8$=$CR_9OCR_{10}R_{11}(CR_{12}R_{13})_a(O)_bCR_{14}$=$CR_{15}R_{16}$, wherein each $R_7$ to $R_{16}$, independently of one another, is selected from —F and a $C_1$-$C_3$ fluoroalkyl group, a is 0 or 1, b is 0 or 1 with the proviso that b is 0 when a is 1.

The polymer (F-1) preferably comprises recurring units derived from ethylene (E) and at least one of chlorotrifluoroethylene (CTFE) and tetrafluoroethylene (TFE).

The polymer (F-1) more preferably comprises:
(a) from 30% to 48%, preferably from 35% to 45% by moles of ethylene (E);
(b) from 52% to 70%, preferably from 55% to 65% by moles of chlorotrifluoroethylene (CTFE), tetrafluoroethylene (TFE) or mixture thereof; and
(c) up to 5%, preferably up to 2.5% by moles, based on the total amount of monomers (a) and (b), of one or more fluorinated and/or hydrogenated comonomer(s).

The comonomer is preferably a hydrogenated comonomer selected from the group of the (meth)acrylic monomers. The hydrogenated comonomer is more preferably selected from the group of the hydroxyalkylacrylate comonomers, such as hydroxyethylacrylate, hydroxypropylacrylate and (hydroxy) ethylhexylacrylate, and alkyl acrylate comonomers, such as n-butyl acrylate.

Among polymers (F-1), ECTFE copolymers, i.e. copolymers of ethylene and CTFE and, optionally, a third comonomer are preferred.

ECTFE polymers suitable in the process of the invention typically possess a melting temperature not exceeding 210° C., preferably not exceeding 200° C., even not exceeding 198° C., preferably not exceeding 195° C., more preferably not exceeding 193° C., even more preferably not exceeding 190° C. The ECTFE polymer has a melting temperature of advantageously at least 120° C., preferably of at least 130° C., still preferably of at least 140° C., more preferably of at least 145° C., even more preferably of at least 150° C.

The melting temperature is determined by Differential Scanning calorimetry (DSC) at a heating rate of 10° C./min, according to ASTM D 3418.

ECTFE polymers which have been found to give particularly good results are those consisting essentially of recurring units derived from:

(a) from 35% to 47% by moles of ethylene (E);
(b) from 53% to 65% by moles of chlorotrifluoroethylene (CTFE).

End chains, defects or minor amounts of monomer impurities leading to recurring units different from those above mentioned can be still comprised in the preferred ECTFE, without this affecting properties of the material.

The melt flow rate of the ECTFE polymer, measured following the procedure of ASTM 3275-81 at 230° C. and 2.16 Kg, ranges generally from 0.01 to 75 g/10 min, preferably from 0.1 to 50 g/10 min, more preferably from 0.5 to 30 g/10 min.

The heat of fusion of polymer (F-1) is determined by Differential Scanning Calorimetry (DSC) at a heating rate of 10° C./min, according to ASTM D 3418.

The polymer (F-1) typically has a heat of fusion of at most 35 J/g, preferably of at most 30 J/g, more preferably of at most 25 J/g.

The polymer (F-1) typically has a heat of fusion of at least 1 J/g, preferably of at least 2 J/g, more preferably of at least 5 J/g.

The polymer (F-1) is advantageously a semi-crystalline polymer.

The polymer (F-2) preferably comprises:

(a') at least 60% by moles, preferably at least 75% by moles, more preferably at least 85% by moles of vinylidene fluoride (VDF); and (b') optionally, from 0.1% to 15% by moles, preferably from 0.1% to 12% by moles, more preferably from 0.1% to 10% by moles of one or more fluorinated monomers selected from vinylfluoride ($VF_1$), chlorotrifluoroethylene (CTFE), hexafluoropropene (HFP), tetrafluoroethylene (TFE), trifluoroethylene (TrFE) and perfluoromethylvinylether (PMVE).

The polymer (F-2) may further comprise from 0.01% to 20% by moles, preferably from 0.05% to 18% by moles, more preferably from 0.1% to 10% by moles of at least one (meth)acrylic monomer as defined above.

The polymer (F-3) preferably comprises recurring units derived from tetrafluoroethylene (TFE) and at least 1.5% by weight, preferably at least 5% by weight, more preferably at least 7% by weight of recurring units derived from at least one fluorinated monomer different from TFE.

The polymer (F-3) preferably comprises recurring units derived from tetrafluoroethylene (TFE) and at most 30% by weight, preferably at most 25% by weight, more preferably at most 20% by weight of recurring units derived from at least one fluorinated monomer different from TFE.

The polymer (F-3) is more preferably selected from the group consisting of:

polymers (F-3A) comprising recurring units derived from tetrafluoroethylene (TFE) and at least one perfluoroalkylvinylether selected from the group consisting of perfluoromethylvinylether of formula $CF_2\!=\!CFOCF_3$, perfluoroethylvinylether of formula $CF_2\!=\!CFOC_2F_5$ and perfluoropropylvinylether of formula $CF_2\!=\!CFOC_3F_7$; and polymers (F-3B) comprising recurring units derived from tetrafluoroethylene (TFE) and at least one perfluorodioxole of formula (I):

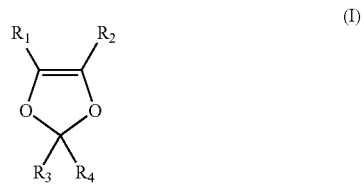

wherein $R_1$, $R_2$, $R_3$ and $R_4$, equal to or different from each other, are independently selected from the group consisting of —F, a $C_1$-$C_3$ perfluoroalkyl group, e.g. —$CF_3$, —$C_2F_5$, —$C_3F_7$, and a $C_1$-$C_3$ perfluoroalkoxy group optionally comprising one oxygen atom, e.g. —$OCF_3$, —$OC_2F_5$, —$OC_3F_7$, —$OCF_2CF_2OCF_3$; preferably, wherein $R_1\!=\!R_2\!=\!$—F and $R_3\!=\!R_4$ is a $C_1$-$C_3$ perfluoroalkyl group, preferably $R_3\!=\!R_4\!=\!$—$CF_3$ or wherein $R_1\!=\!R_3\!=\!R_4\!=\!$—F and $R_2$ is a $C_1$-$C_3$ perfluoroalkoxy, e.g. —$OCF_3$, —$OC_2F_5$, —$OC_3F_7$.

Non-limitative examples of suitable polymers (F-3A) include, notably, those commercially available under the trademark name HYFLON® PFA P and M series and HYFLON® MFA from Solvay Specialty Polymers Italy S.p.A.

The polymer (F-3B) more preferably comprises recurring units derived from tetrafluoroethylene (TFE) and at least one perfluorodioxole of formula (I) as defined above wherein $R_1\!=\!R_3\!=\!R_4\!=\!$—F and $R_2\!=\!$—$OCF_3$ or wherein $R_1\!=\!R_2\!=\!$—F and $R_3\!=\!R_4\!=\!$—$CF_3$.

Non-limitative examples of suitable polymers (F-3B) include, notably, those commercially available under the trademark name HYFLON® AD from Solvay Specialty Polymers Italy S.p.A. and TEFLON® AF from E. I. Du Pont de Nemours and Co.

The polymer (F-4) preferably comprises recurring units derived from at least one cyclopolymerizable monomer of formula $CR_7R_8\!=\!CR_9OCR_{10}R_{11}$ $(CR_{12}R_{13})_a(O)_bCR_{14}\!=\!CR_{15}R_{16}$, wherein each $R_7$ to $R_{16}$, independently of one another, is —F, a=1 and b=0.

The polymer (F-4) is typically amorphous.

Non-limitative examples of suitable polymers (F-4) include, notably, those commercially available under the trademark name CYTOP® from Asahi Glass Company.

The polymer (F) is typically manufactured by suspension or emulsion polymerization processes.

Within the context of the present invention, the term "at least one poly(aryl ether ketone) polymer [polymer (PAEK)]" is intended to denote one or more than one polymer (PAEK). Mixtures of polymers (PAEK) can be advantageously used for the purpose of the invention.

For the purpose of the invention, the term "poly(aryl ether ketone) polymer [polymer (PAEK)]" is intended to denote any polymer comprising recurring units wherein more than 50% by moles of said recurring units are recurring units ($R_{PAEK}$) comprising a Ar—C(O)—Ar' group, wherein Ar and Ar', equal to or different from each other, are aromatic moieties comprising at least one aromatic mono- or polynuclear cycle. The recurring units ($R_{PAEK}$) are generally selected from the group consisting of those of formulae (J-A) to (J-O) here below:

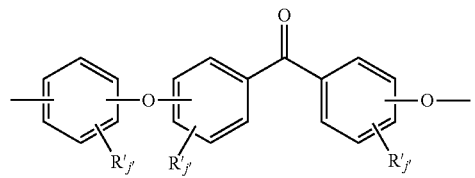
(J-A)
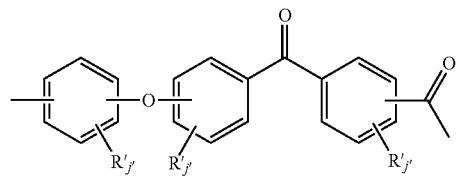
(J-B)
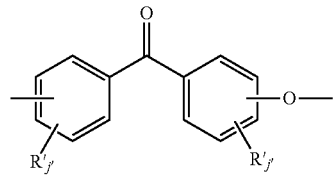
(J-C)
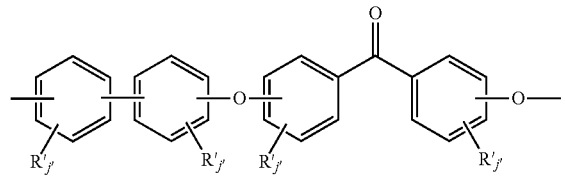
(J-D)
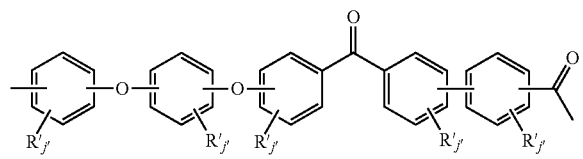
(J-E)
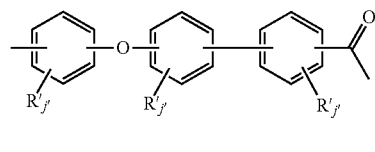
(J-F)
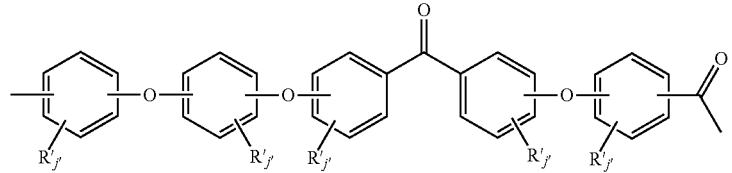
(J-G)
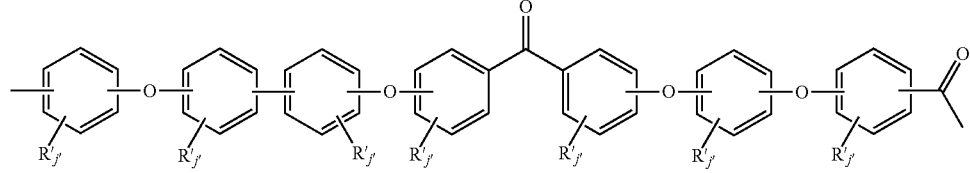
(J-H)
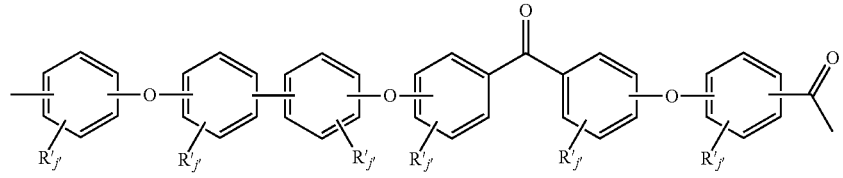
(J-I)
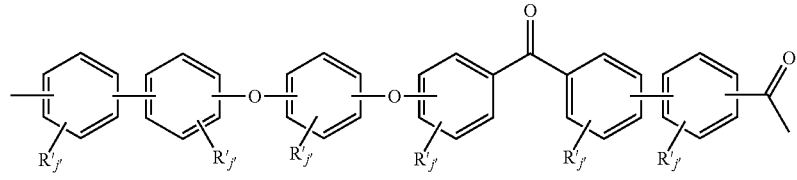
(J-J)
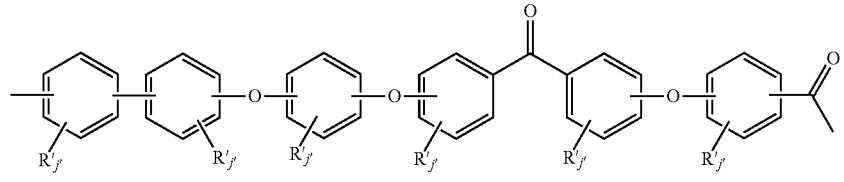
(J-K)

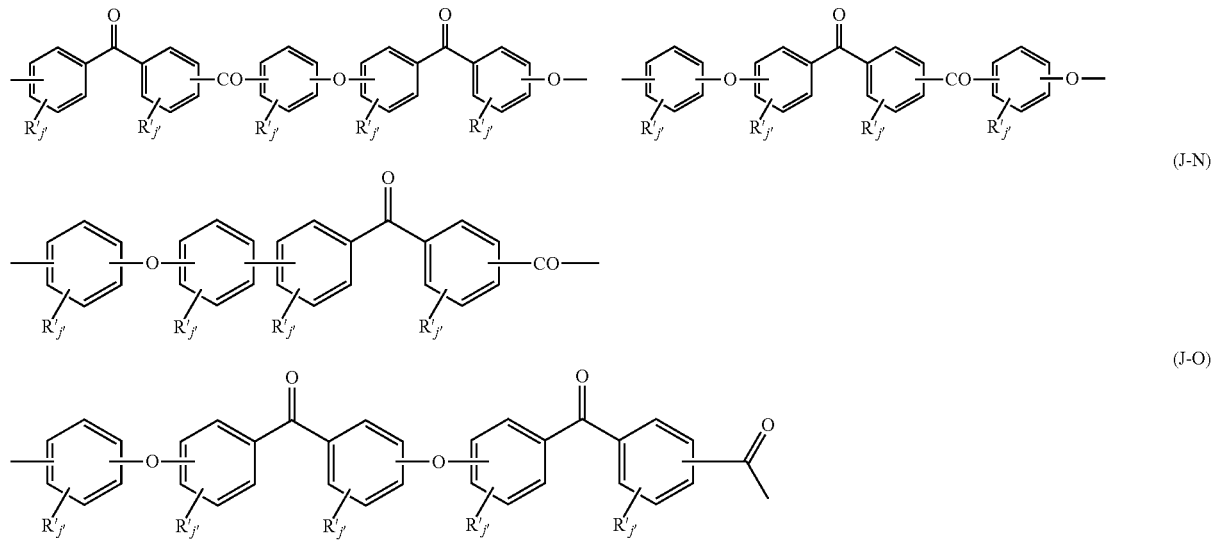

wherein:
- each of R', equal to or different from each other, is selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium;
- j' is zero or an integer from 1 to 4.

In recurring units ($R_{PAEK}$), the respective phenylene moieties may independently have 1,2-, 1,4- or 1,3-linkages to the other moieties different from R' in the recurring units. Preferably, said phenylene moieties have 1,3- or 1,4-linkages, more preferably they have 1,4-linkage.

Still, in recurring units ($R_{PAEK}$), j' can be at each occurrence zero, that is to say that the phenylene moieties have no other substituents than those enabling linkage in the main chain of the polymer (PAEK).

Preferred recurring units ($R_{PAEK}$) are thus selected from the group consisting of those of formulae (J'-A) to (J'-O) here below:

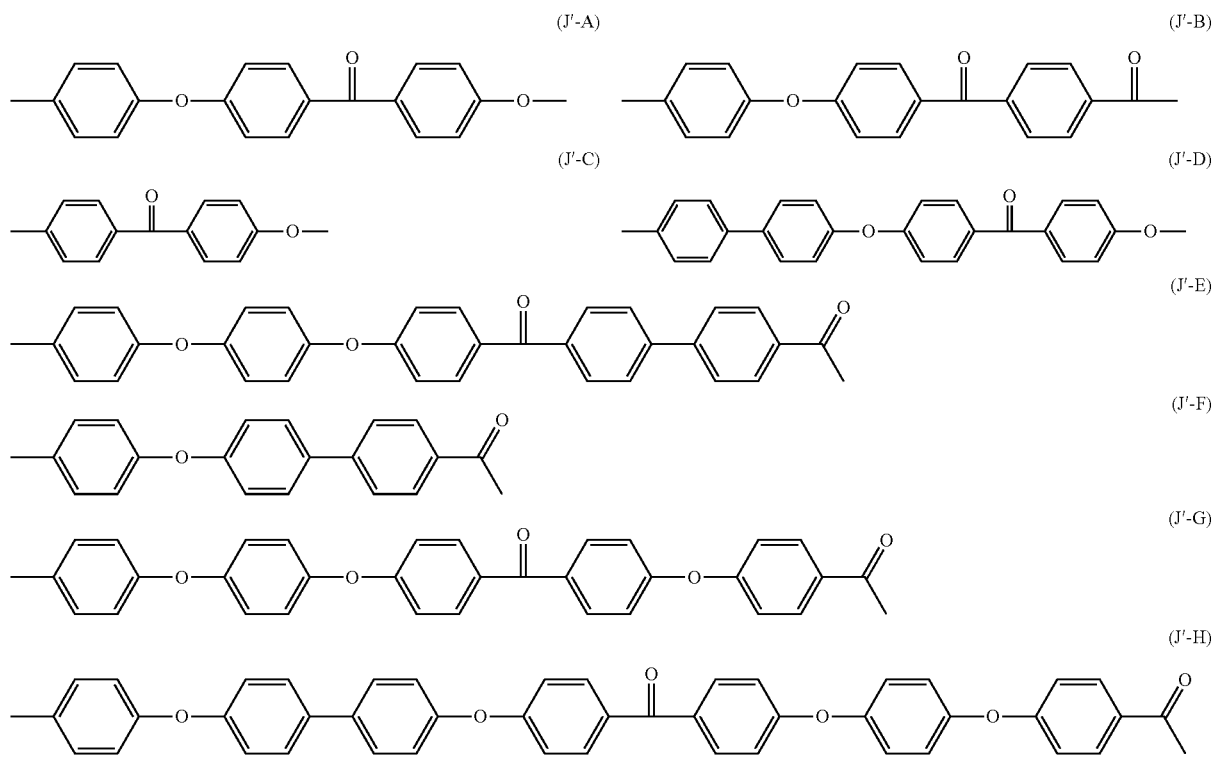

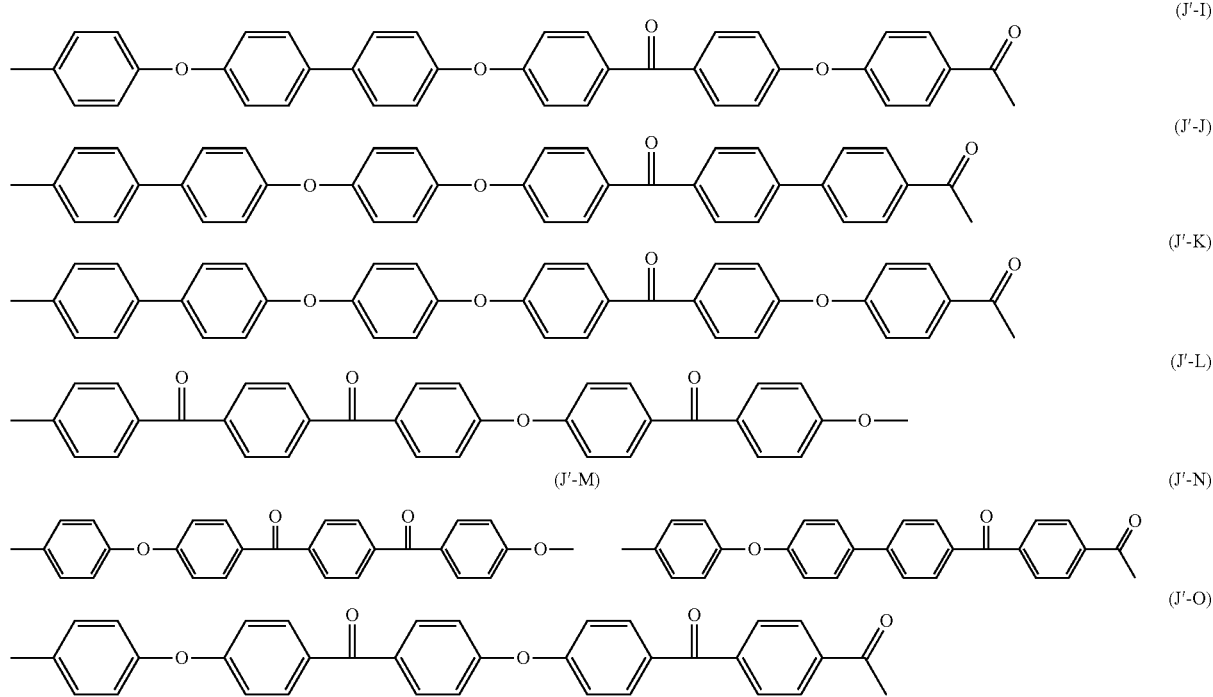

In the polymer (PAEK), as defined above, preferably more than 60% by moles, more preferably more than 80% by moles, even more preferably more than 90% by moles of the recurring units are recurring units ($R_{PAEK}$) as defined above.

Still, it is generally preferred that substantially all recurring units of the polymer (PAEK) are recurring units ($R_{PAEK}$) as defined above; chain defects or minor amounts of other recurring units might be present, being understood that these latter do not substantially modify the properties of recurring units ($R_{PAEK}$).

The polymer (PAEK) may be notably a homopolymer or a copolymer such as a random, alternate or block copolymer. When the polymer (PAEK) is a copolymer, it may notably contain (i) recurring units ($R_{PAEK}$) of at least two different formulae chosen from formulae (J-A) to (J-O), or (ii) recurring units ($R_{PAEK}$) of one or more formulae (J-A) to (J-O) and recurring units ($R*_{PAEK}$) different from recurring units ($R_{PAEK}$).

As will be detailed later on, the polymer (PAEK) may be a poly(ether ether ketone) polymer [polymer (PEEK)]. Alternatively, the polymer (PAEK) may be a poly(ether ketone ketone) polymer [polymer (PEKK)], a poly(ether ketone) polymer [polymer (PEK)], a poly(ether ether ketone ketone) polymer [polymer (PEEKK)], or a poly(ether ketone ether ketone ketone) polymer [polymer (PEKEKK)].

The polymer (PAEK) may also be a blend comprising at least two different polymers (PAEK) selected from the group consisting of polymers (PEKK), polymers (PEEK), polymers (PEK) and polymers (PEEKK), as defined above.

For the purpose of the present invention, the term "polymer (PEEK)" is intended to denote any polymer comprising recurring units wherein more than 50% by moles of said recurring units are recurring units ($R_{PAEK}$) of formula J'-A.

Preferably more than 75% by moles, more preferably more than 85% by moles, even more preferably more than 95% by moles, still more preferably more than 99% by moles of the recurring units of the polymer (PEEK) are recurring units ($R_{PAEK}$) of formula J'-A. Most preferably all the recurring units of the polymer (PEEK) are recurring units ($R_{PAEK}$) of formula J'-A.

For the purpose of the present invention, the term "polymer (PEKK)" is intended to denote any polymer comprising recurring units wherein more than 50% by moles of said recurring units are recurring units ($R_{PAEK}$) of formula J'-B.

Preferably more than 75% by moles, more preferably more than 85% by moles, even more preferably more than 95% by moles, still more preferably more than 99% by moles of the recurring units of the polymer (PEKK) are recurring units ($R_{PAEK}$) of formula J'-B. Most preferably all the recurring units of the polymer (PEKK) are recurring units ($R_{PAEK}$) of formula J'-B.

The composition (C1) may further comprise one or more additives, such as, but not limited to, impact modifiers, plasticizers, processing aids, fillers, pigments, antioxidants, antistatic agents, surfactants, dispersing aids and fire retardants.

The skilled in the art, depending on the thickness of the layer (L1), will select the proper amount of one or more additives in the composition (C1).

Under step (A-i) of the process of the invention, the composition (C1) is typically manufactured using standard methods.

Usual mixing devices such as static mixers and high intensity mixers can be used. High intensity mixers are preferred for obtaining better mixing efficiency.

Under step (A-i) of the process of the invention, the composition (C1) is typically processed in molten phase using melt-processing techniques. The composition (C1) is usually processed by extrusion through a die at temperatures generally comprised between 100° C. and 300° C. to yield strands which are usually cut for providing pellets. Twin screw extruders are preferred devices for accomplishing melt compounding of the composition (C1).

The layer (L1) is typically manufactured by processing the pellets so obtained through traditional film extrusion techniques. Film extrusion is preferably accomplished using a flat cast film extrusion process or a hot blown film extrusion process.

The layer (L1) is preferably further processed by one or more planarization techniques.

Non-limitative examples of suitable planarization techniques include, notably, bistretching, polishing and planarization coating treatments.

It has been found that by further processing the layer (L1) by one or more planarization techniques its surface is rendered smooth so as to ensure higher interlayer adhesion with the layer (L2).

Under step (A-ii) of the process of the invention, at least one surface, preferably the inner surface, of the layer (L1) is treated by a radio-frequency glow discharge process in the presence of an etching gas medium thereby providing at least one surface comprising one or more grafted functional groups [surface (L1-f)].

The term "functional group" is used herein according to its usual meaning to denote a group of atoms linked to each other by covalent bonds which is responsible for the reactivity of the surface (L1-f) of the polymer (1).

For the purpose of the present invention, the term "grafted functional groups" is intended to denote functional groups obtainable by grafting onto to the main chain of the polymer (1).

For the purpose of the present invention, the term "grafting" is used according to its usual meaning to denote a radical process by which one or more functional groups are inserted onto the surface of a polymer backbone.

The grafted functional groups obtainable by treating at least one surface of the layer (L1) with a radio-frequency glow discharge process in the presence of an etching gas medium typically comprise at least one atom of said etching gas medium.

By "radio-frequency glow discharge process", it is hereby intended to denote a process powered by a radio-frequency amplifier wherein a glow discharge is generated by applying a voltage between two electrodes in a cell containing an etching gas. The glow discharge so generated then typically passes through a jet head to arrive to the surface of the material to be treated.

By "etching gas medium", it is hereby intended to denote either a gas or a mixture of gases suitable for use in a radio-frequency glow discharge process.

The etching gas is preferably selected from the group consisting of air, $N_2$, $NH_3$, $CH_4$, $CO_2$, He, $O_2$, $H_2$ and mixtures thereof.

The etching gas medium more preferably comprises $N_2$ and/or $NH_3$ and, optionally, $H_2$.

The radio-frequency glow discharge process is typically carried out under reduced pressure or under atmospheric pressure.

The radio-frequency glow discharge process is preferably carried out under atmospheric pressure at about 760 Torr.

Atmospheric-pressure plasmas have prominent technical significance because, in contrast with low-pressure plasma or high-pressure plasma, no reaction vessel is needed to ensure the maintenance of a pressure level differing from atmospheric pressure.

The radio-frequency glow discharge process is typically carried out at a radio-frequency comprised between 1 kHz and 100 kHz.

The radio-frequency glow discharge process is typically carried out at a voltage comprised between 1 kV and 50 kV.

According to a first embodiment of the process of the invention, the radio-frequency glow discharge process under step (A-ii) generates a corona discharge.

The radio-frequency glow discharge process of this first embodiment of the process of the invention is typically carried out at a radio-frequency comprised between 5 kHz and 15 kHz.

The radio-frequency glow discharge process of this first embodiment of the process of the invention is typically carried out at a voltage comprised between 1 kV and 20 kV.

The corona discharge typically has a density comprised between $1 \times 10^9$ and $1 \times 10^{13}$ $cm^{-3}$.

According to a second embodiment of the process of the invention, the radio-frequency glow discharge process under step (A-ii) generates a plasma discharge.

The radio-frequency glow discharge process of this second embodiment of the process of the invention is typically carried out at a radio-frequency comprised between 10 kHz and 100 kHz.

The radio-frequency glow discharge process of this second embodiment of the process of the invention is typically carried out at a voltage comprised between 5 kV and 15 kV.

The plasma discharge typically has a density comprised between $1 \times 10^{16}$ and $1 \times 10^{19}$ $cm^{-3}$.

The Applicant has found that, after treatment of the layer (L1) by a radio-frequency glow discharge process in the presence of an etching gas, the layer (L1) successfully maintains its bulk properties including its flexibility properties.

Non-limitative examples of grafted functional groups of the surface (L1-f) of the layer (L1), obtainable by treatment of the surface of the layer (L1) with a radio-frequency glow discharge process in the presence of an etching gas medium comprising $N_2$ and/or $NH_3$ and, optionally, $H_2$, typically under atmospheric pressure, include, notably, those selected from the group consisting of amine groups (—$NH_2$), imine groups (—CH=NH), nitrile groups (—CN) and amide groups (—$CONH_2$).

The nature of the grafted functional groups of the surface (L1-f) of the layer (L1) can be determined by any suitable techniques, typically by FT-IR techniques such as Attenuated Total Reflectance (ATR) coupled to FT-IR techniques or by X-ray induced photoelectron spectroscopy (XPS) techniques.

The Applicant has surprisingly found that the surface (L1-f) is successfully continuously adhered to the layer (L2) without any intermediate tie layer.

The Applicant has also found that the surface (L1-f) advantageously provides for outstanding interlayer adhesion with a layer (L2) applied thereto by electroless deposition.

For the purpose of the present invention, by "electroless deposition" it is meant a redox process, typically carried out in a plating bath, wherein a metal compound is reduced from its oxidation state to its elemental state in the presence of suitable chemical reducing agents.

Under step (A-iii) of the process of the invention, the surface (L1-f) of the layer (L1) is typically contacted with an electroless metallization catalyst thereby providing a catalytic layer [layer ($L1_c$)].

The layer (L2) is then typically obtainable by electroless deposition onto the layer ($L1_c$) using a composition (C2) comprising at least one metal ion deriving from at least one metal compound (M1).

The Applicant thinks, without this limiting the scope of the invention, that the layer ($L1_c$) is a transient intermediate of the electroless deposition process so that the layer (L2) is finally directly adhered to the surface (L1-f) of the layer (L1).

The electroless metallization catalyst is typically selected from the group consisting of catalysts based on palladium, platinum, rhodium, iridium, nickel, copper, silver and gold.

The electroless metallization catalyst is preferably selected from palladium catalysts such as $PdCl_2$.

The surface (L1-f) of the layer (L1) is typically contacted with the electroless metallization catalyst in liquid phase in the presence of at least one liquid medium.

The composition (C2) typically comprises at least one metal ion deriving from at least one metal compound (M1), at least one reducing agent, at least one liquid medium and, optionally, one or more additives.

The metal compound (M1) is typically selected from the group consisting of Rh, Ir, Ru, Ti, Re, Os, Cd, Tl, Pb, Bi, In, Sb, Al, Ti, Cu, Ni, Pd, V, Fe, Cr, Mn, Co, Zn, Mo, W, Ag, Au, Pt, Ir, Ru, Pd, Sn, Ge, Ga, alloys thereof and derivatives thereof.

The metal compound (M1) is preferably selected from the group consisting of Cu, Al, Ni, Ag, Pd, Au and alloys thereof.

Non-limitative examples of suitable liquid media include, notably, water, organic solvents and ionic liquids.

Among organic solvents, alcohols are preferred such as ethanol.

Non-limitative examples of suitable reducing agents include, notably, formaldehyde, sodium hypophosphite and hydrazine.

Non-limitative examples of suitable additives include, notably, salts, buffers and other materials suitable for enhancing stability of the catalyst in the liquid composition.

The layer (L2) has typically a thickness comprised between 0.05 μm and 5 μm, preferably between 0.8 μm and 1.5 μm.

The thickness of the layer (L2) can be measured by any suitable techniques, typically by scanning electron microscopy (SEM) techniques.

The process of the invention may further comprise a step (A-iv) wherein a layer (L3) is applied onto the opposite side of the layer (L2) by electro-deposition.

For the purpose of the present invention, by "electro-deposition" it is meant a process, typically carried out in an electrolytic cell using an electrolytic solution, wherein an electric current is used to reduce a metal compound from its oxidation state to its elemental state.

The layer (L3) is typically applied onto the opposite side of the layer (L2) by electro-deposition using a composition (C3) comprising at least one metal ion deriving from at least one metal compound (M2).

The metal compound (M2), equal to or different from the metal compound (M1), is typically selected from the group consisting of Rh, Ir, Ru, Ti, Re, Os, Cd, Tl, Pb, Bi, In, Sb, Al, Ti, Cu, Ni, Pd, V, Fe, Cr, Mn, Co, Zn, Mo, W, Ag, Au, Pt, Ir, Ru, Pd, Sn, Ge, Ga, alloys thereof and derivatives thereof.

The metal compound (M2) is preferably selected from the group consisting of Cu, Al, Ni, Ag, Pd, Au and alloys thereof.

The composition (C3) preferably comprises at least one metal ion deriving from at least one metal compound (M2), at least one metal halide and, optionally, at least one ionic liquid.

Non-limitative examples of suitable ionic liquids include, notably, those comprising:

a cation selected from the group consisting of a sulfonium ion or an imidazolium, pyridinium, pyrrolidinium or piperidinium ring, said ring being optionally substituted on the nitrogen atom, in particular by one or more alkyl groups with 1 to 8 carbon atoms, and on the carbon atoms, in particular by one or more alkyl groups with 1 to 30 carbon atoms, and an anion selected from the group consisting of halide anions, perfluorinated anions and borates.

Under step (A-iv) of the process of the invention, if any, the opposite surface of the layer (L2) is advantageously continuously adhered to a layer (L3).

The layer (L3) has typically a thickness comprised between 0.1 μm and 30 μm, preferably between 1 μm and 15 μm.

The thickness of the layer (L3) can be measured by any suitable techniques, typically by scanning electron microscopy (SEM) techniques.

The insulation system provided either in step (A-iii) or in step (A-iv), if any, of the process of the invention is typically dried, preferably at a temperature comprised between 50° C. and 150° C., more preferably at a temperature comprised between 100° C. and 150° C.

According to a preferred embodiment of the invention, the insulation system of the invention comprises one or more insulation blankets, wherein each of said insulation blankets comprises:

a core consisting of an insulation material [material (I)], and a shell encapsulating said core, said shell comprising at least one multilayer assembly comprising:

(1) an outer layer (L1) wherein the inner surface comprises one or more grafted functional groups [surface (L1-0], (2) directly adhered to said surface (L1-0, a layer (L2) consisting of Cu and, (3) optionally, directly adhered to the opposite side of the layer (L2), a layer (L3) consisting of at least one metal selected from Cu, Al, Ni, Ag, Pd, Au and alloys thereof.

The process of the invention may also further comprise steps (A-v) to (A-vii) wherein one or more layers are applied onto the opposite side of a layer (L2) or a layer (L3), if any.

The core of the insulation system of the invention typically consists of an insulation material [material (I)] selected from a foam material and an organic or inorganic fibrous material.

The layer (L4) typically consists of an inorganic material [material (IN)] selected from the group consisting of inorganic platelet materials.

The layer (L5) is typically used to let the layers of the multilayer assembly of the shell adhere to each other.

The layer (L5) typically consists of materials selected from the group consisting of polyester-based adhesive layers, polyvinyl fluoride-based adhesive layers, silicone-based adhesive layers and mixtures thereof.

The layer (L5) may further comprise at least one fire-retardant additive selected from antimony compounds, hydrated alumina compounds, borates, carbonates, bicarbonates, inorganic halides, phosphates, sulfates, organic halogens or organic phopshates.

The layer (L6) is typically a woven fabric consisting of a polymer (2) selected from the group consisting of polyamides, polyesters, polyimides and poly(aryl ether ketones).

Under any one of steps (A-v) to (A-vii) of the process of the invention, if any, the layers are typically applied onto each other by techniques commonly known in the art.

Among conventional techniques, mention can be notably made of melt-processing techniques such as colaminating, coextrusion, for example coextrusion-laminating, coextrusion-blow moulding and coextrusion-moulding, extrusion-coating, coating, overinjection-moulding or coinjection-moulding techniques.

The choice of one or other of these techniques is typically made on the basis of the material and of the thickness of each of said layers.

Should the disclosure of any patents, patent applications, and publications which are incorporated herein by reference conflict with the description of the present application to the extent that it may render a term unclear, the present description shall take precedence.

The invention will be now described in more detail with reference to the following examples whose purpose is merely illustrative and not limitative of the scope of the invention.

Raw Materials

PEEK commercially available under the trademark name KETASPIRE® [PEEK-1].

Evaluation of Water Vapour Permeability

Water vapour permeability was measured according to ASTM F1249 standard test procedures by means of the Water Vapor Transmission Rate (WVTR). The WTR represents the volume of water vapour that passes through a unit thickness of material per unit area per unit time per unit barometric pressure. The WVTR was measured at 38° C. at a relative humidity of 90%.

EXAMPLE 1—MANUFACTURE OF AN INSULATION SYSTEM

1-A—Manufacture of PEEK-1 Layer

The PEEK-1 layer was manufactured by processing PEEK-1 pellets in a coextrusion cast film line equipped with a 2.5" single stage extruder. The extruder was connected to a flat auto-gauge die. Upon exit from the die, a molten tape was casted on three subsequent chill rolls, whose speed was adapted so as to obtain the desired film thickness. Total thickness and thickness variation along the width were controlled by a Beta-ray gauge control system with retrofit to the die.

1-B—Surface Modification

The PEEK-1 layer obtained according to Example 1-A was treated at atmospheric pressure by a radio-frequency plasma discharge process. The etching gas was a mixture of $N_2$ (95% by volume) and $H_2$ (5% by volume). The working frequency was 40 kHz and the voltage was 20 kV. It has been found by XPS analysis that the so treated surface of the PEEK-1 layer comprises functional groups containing nitrogen groups (2.87 At %).

1-C—Metallization Process

The PEEK-1 layer obtained according to Example 1-B was coated with metallic copper by electroless plating. Prior to copper deposition, the PEEK-1 layer so treated was activated by immersion in an aqueous solution containing 0.03 g/L of $PdCl_2$ for 1 minute, resulting in the treated PEEK-1 layer being entirely coated with Pd particles at a high density. The activated PEEK-1 layer was then immersed in an aqueous plating bath containing 10 g/L of $CuSO_4$ and 0.01 g/L of formaldehyde. The plating temperature was 25° C. and its pH value was 4.

COMPARATIVE EXAMPLE 1

The PEEK-1 layer obtained according to Example 1-A was provided as such. As confirmed by XPS analysis, the surface of the PEEK-1 layer does not contain functional groups containing nitrogen groups.

It has been found that the metallized polymer (1) layers of the insulation system according to the invention advantageously provide for lower water vapour permeability as compared with untreated polymer (1) layers (see Table 1 here below).

TABLE 1

| Run | WVTR [perms U.S.] |
|---|---|
| Ex. 1 | 0.1 |
| C. Ex. 1 | 0.2 |

The insulation system according to the invention is thus particularly suitable for use in aircraft applications.

The invention claimed is:

1. A process for the manufacture of an insulation system comprising one or more insulation blankets, said process comprising:
   encapsulating a core consisting of an insulation material (I) with a shell comprising a multilayer assembly, said multilayer assembly being obtained by:
   treating at least one surface of a layer (L1) by a radio-frequency glow discharge process in the presence of an etching gas medium, wherein layer (L1) consists of a composition (C1) comprising at least one poly(aryl ether ketone) polymer having a limiting oxygen index (LOI) of at least 30% by volume,
   applying by electroless deposition a layer (L2) onto said at least one treated surface of layer (L1), wherein layer (L2) consists of at least one metal compound (M1), and optionally, applying by electro-deposition a layer (L3) onto the opposite side of layer (L2) wherein layer (L3) consists of at least one metal compound (M2), said metal compound (M2) being equal to or different from said metal compound (M1).

2. The process according to claim 1, wherein layer (L1) is the outer layer of the shell.

3. The process according to claim 1, wherein the etching gas medium is selected from the group consisting of air, $N_2$, $NH_3$, $CH_4$, $CO_2$, He, $O_2$, $H_2$ and mixtures thereof.

4. The process according to claim 3, wherein the etching gas medium comprises $N_2$ and/or $NH_3$ and, optionally, $H_2$.

5. The process according to claim 1, wherein metal compound (M1) is selected from the group consisting of Rh, Ir, Ru, Ti, Re, Os, Cd, Tl, Pb, Bi, In, Sb, Al, Ti, Cu, Ni, Pd, V, Fe, Cr, Mn, Co, Zn, Mo, W, Ag, Au, Pt, Ir, Ru, Pd, Sn, Ge, Ga, alloys thereof and derivatives thereof.

6. The process according to claim 1, wherein layer (L3) is applied onto the opposite side of the layer (L2) by electro-deposition.

7. The process according to claim 6, wherein metal compound (M2) is selected from the group consisting of Rh, Ir, Ru, Ti, Re, Os, Cd, Tl, Pb, Bi, In, Sb, Al, Ti, Cu, Ni, Pd, V, Fe, Cr, Mn, Co, Zn, Mo, W, Ag, Au, Pt, Ir, Ru, Pd, Sn, Ge, Ga, alloys thereof and derivatives thereof.

8. An insulation system comprising one or more multilayer insulation blankets, wherein each of said multilayer insulation blankets comprises:
- a core consisting of an insulation material (I), and
- a shell encapsulating said core, said shell comprising at least one multilayer assembly comprising:

(1) an outer layer (L1) consisting of a composition (C1) comprising at least one poly(aryl ether ketone) polymer having a limiting oxygen index (LOI) of at least 30% by volume, wherein at least one surface (L1-f) of said layer (L1) comprises one or more grafted functional groups,
(2) directly adhered to said at least one surface (L1-f), a layer (L2) consisting of at least one metal compound (M1), and
(3) optionally, directly adhered to the opposite side of the layer (L2), a layer (L3) consisting of at least one metal compound (M2), said metal compound (M2) being equal to or different from said metal compound (M1).

9. The insulation system according to claim 8, wherein the one or more grafted functional groups are selected from the group consisting of amine groups ($-NH_2$), imine groups ($-CH=NH$), nitrile groups ($-CN$) and amide groups ($-CONH_2$).

10. The insulation system according to claim 8, wherein layer (L2) has a thickness between 0.05 μm and 5 μm.

11. The insulation system according to claim 8, wherein layer (L3), if any, has a thickness between 0.1 μm and 30 μm.

12. An aircraft insulation system comprising the insulation system according to claim 8.

13. The process according to claim 1, wherein composition (C1) consists of at least one thermoplastic polymer (1) having a limiting oxygen index (LOI) of at least 20% by volume.

14. The insulation system according to claim 8, wherein composition (C1) consists of at least one thermoplastic polymer (1) having a limiting oxygen index (LOI) of at least 20% by volume.

15. The insulation system according to claim 10, wherein layer (L2) has a thickness between 0.8 μm and 1.5 μm.

16. The insulation system according to claim 11, wherein layer (L3), if any, has a thickness between 1 μm and 15 μm.

* * * * *